US012646701B2

(12) United States Patent
Sugawara et al.

(10) Patent No.: US 12,646,701 B2
(45) Date of Patent: Jun. 2, 2026

(54) MASS SPECTROMETRY DEVICE AND METHOD FOR CONTROLLING SAME

(71) Applicant: HITACHI HIGH-TECH CORPORATION, Tokyo (JP)

(72) Inventors: Yuka Sugawara, Tokyo (JP); Yuichiro Hashimoto, Tokyo (JP); Hiroyuki Yasuda, Tokyo (JP); Masuyuki Sugiyama, Tokyo (JP); Riku Tamura, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 396 days.

(21) Appl. No.: 18/270,878

(22) PCT Filed: Jan. 17, 2022

(86) PCT No.: PCT/JP2022/001456

§ 371 (c)(1),
(2) Date: Jul. 5, 2023

(87) PCT Pub. No.: WO2022/158430

PCT Pub. Date: Jul. 28, 2022

(65) Prior Publication Data

US 2024/0063010 A1 Feb. 22, 2024

(30) Foreign Application Priority Data

Jan. 22, 2021 (JP) ................................ 2021-008963

(51) Int. Cl.
*H01J 49/02* (2006.01)
*H01J 49/42* (2006.01)

(52) U.S. Cl.
CPC ........ *H01J 49/022* (2013.01); *H01J 49/4215* (2013.01)

(58) Field of Classification Search
CPC .. H01J 49/022; H01J 49/4215; H01J 49/0027; H01J 49/0031
See application file for complete search history.

(56) References Cited

U.S. PATENT DOCUMENTS

2010/0133429 A1 6/2010 Nakajima et al.

FOREIGN PATENT DOCUMENTS

JP 10-112282 A 4/1998
JP 2011-23167 A 2/2011
(Continued)

OTHER PUBLICATIONS

Japanese Office Action received in corresponding Japanese Application No. 2022-576677 dated Jan. 9, 2024.
(Continued)

*Primary Examiner* — David E Smith
(74) *Attorney, Agent, or Firm* — MATTINGLY & MALUR, PC

(57) ABSTRACT

A mass spectrometry device can reduce a deviation in a mass axis due to the generation of heat from an AC voltage control circuit; and a method for controlling the mass spectrometry device. The mass spectrometry device has a quadrupole electrode, to which a controlled AC voltage is applied, and uses the quadrupole electrode as a mass filter. Before measurement, the mass spectrometry device applies an AC voltage of a prescribed amplitude V1 to the multipole electrode for a prescribed time T1, and a heating value J1 that is generated when the AC voltage of the prescribed amplitude V1 is applied to the multipole electrode for the prescribed time T1 is equivalent to a heating value that is generated when the AC voltage of the amplitude that is applied during the measurement is applied until a thermally steady state is reached (see FIG. 3A).

4 Claims, 6 Drawing Sheets

(56) References Cited

FOREIGN PATENT DOCUMENTS

| | | | | |
|---|---|---|---|---|
| JP | 2011023167 | A | * | 2/2011 |
| JP | 2014-146525 | A | | 8/2014 |
| WO | 2008/133074 | A1 | | 11/2008 |

OTHER PUBLICATIONS

International Search Report of PCT/JP2022/001456 dated Mar. 15, 2022.

* cited by examiner

MASS SPECTROMETRY DEVICE AND METHOD FOR CONTROLLING SAME

TECHNICAL FIELD

The present disclosure relates to a mass spectrometer and a method of controlling the mass spectrometer.

BACKGROUND ART

A mass spectrometer generates vacuum inside where variously shaped electrodes are placed so that internally introduced ions are controlled and selected in an electric field. A quadrupole mass spectrometer (QMS) which is called a quadrupole mass filter (QMF) has four columnar electrodes. The columnar electrodes are assembled so that each center of the circular cross-section of the electrode constitutes each corner of a square. Positive/negative DC voltage±U and high frequency voltage±V·cos Ωt are superimposed so that the voltage±U±V·cos ωt is applied to adjacently placed columnar electrodes which have been fixed. In accordance with the voltage applied to the electrodes and frequency, ions as a predetermined part of those introduced into the columnar electrodes stably vibrate, and pass therethrough. Meanwhile, each vibration of the rest of ions is intensified during passage through the electrodes, and they no longer pass through the electrodes because of collision therewith. The mass spectrum is obtained by linearly changing the high frequency voltage while keeping the ratio between the DC voltage and the high frequency voltage constant.

As the mass spectrometer controls ions in the electric field, accuracy stability of the DC voltage and high frequency voltage which are applied to the electrodes directly leads to mass axial stability as performance of the device. Accordingly, the DC voltage and the high frequency voltage are required to satisfy severe specification. The voltage applied to the QMF electrode needs to secure the accuracy stability in the order of ppm.

The device has been equipped in company or university laboratory, and further equipped in clinical laboratory of hospital. As the use environment of such device has been diversified, it has to be operated in the temperature range from 5 to 35° C. However, change in the ambient temperature of the mass spectrometer varies temperature of the control board for generating the DC voltage and the high frequency voltage. Correspondingly, the DC voltage and the high frequency voltage are changed, resulting in fluctuation of the mass axis.

The following patent literature 1 relates to technology for reducing the time required for the temperature change around the detector circuit. The patent literature discloses the technology for "controlling so that the filter section selects the ion with maximum mass-to-charge ratio before supplying cathode current to the cathode electrode. Selection of the ion with maximum mass-to-charge ratio allows generated heat to be maximized by the high frequency generating coil. Heat generation by the coil may raise the temperature around the detector circuit to a certain degree. This makes it possible to reduce the time required for the temperature change around the detector circuit upon supply of the cathode current to the cathode electrode. Accordingly, the time taken for changing the resolution can be reduced, resulting in smooth partial pressure measurement" (see paragraph 0018).

CITATION LIST

Patent Literature

Patent Literature 1: WO2008/133074

SUMMARY OF INVENTION

Technical Problem

Change in the amplitude of AC voltage applied to the multipole electrode causes heat generation in circuit elements for controlling the AC voltage. The generated heat changes the amplitude of AC voltage applied to the multipole, resulting in deviation of the mass axis on the mass spectrum.

The generally employed mass spectrometer as disclosed in the patent literature 1 is configured to suppress deviation of the mass axis by applying AC voltage with maximum amplitude before measurement. In the disclosed method, however, the use of smaller amplitude in the next measurement has not been taken into account.

In light of the technical problem as described above, the present disclosure has been made to provide the mass spectrometer and the method of controlling the mass spectrometer, which suppress deviation of the mass axis owing to heat generated by the control circuit of AC voltage.

Solution to Problem

In order to solve the problem as described above, structures disclosed in the claim may be adopted.

Advantageous Effects of Invention

The disclosure provides the mass spectrometer and the method of controlling the mass spectrometer, which suppress deviation of the mass axis owing to heat generated in the control circuit of AC voltage. Problems, structures, and effects other than those described above are clarified by explanation of the following example hereinafter.

DESCRIPTION OF EMBODIMENT

Figure 1:
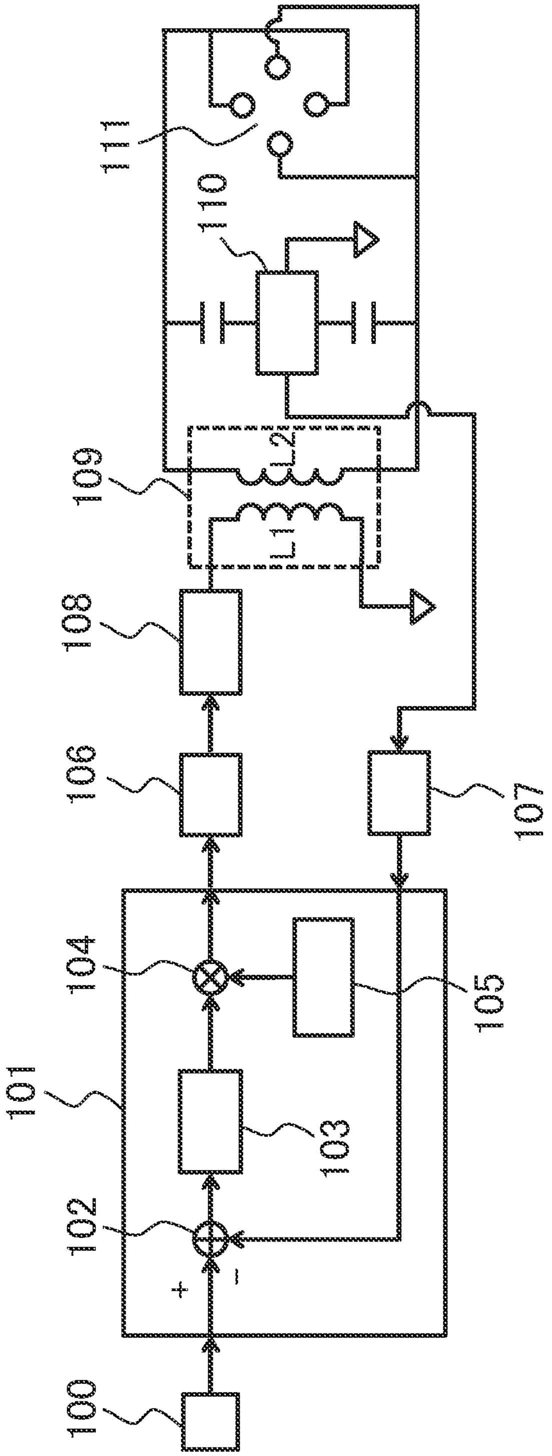
FIG. 1 is a block diagram of a high frequency voltage generation section of a quadrupole mass spectrometer.

An example according to the disclosure is described referring to the drawings.

Figure 5:
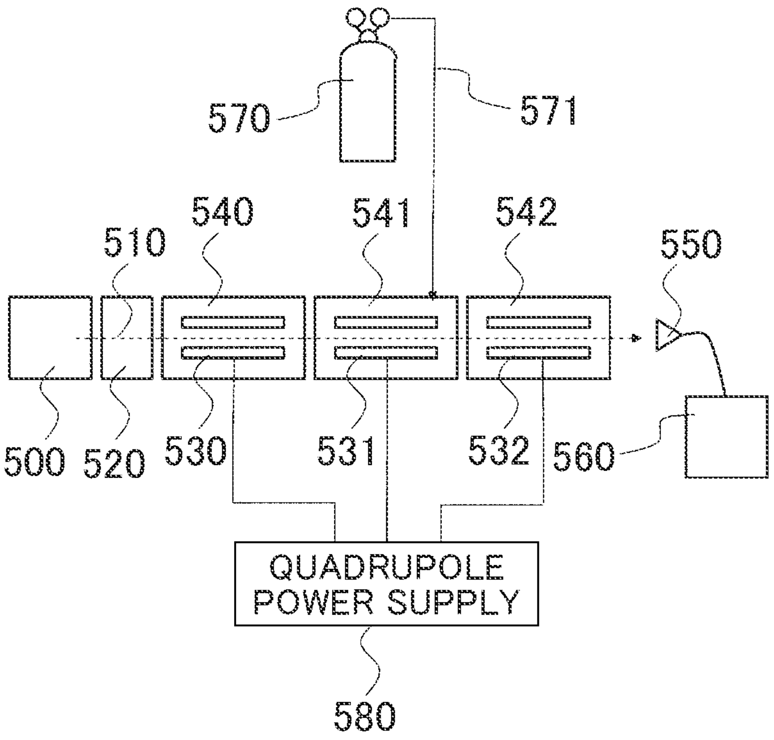
FIG. 5 is a block diagram of a mass spectrometer to be used in an example.

FIG. 5 is a block diagram of a mass spectrometer to be used in the example of the present disclosure. A measurement sample fed by a pump of the liquid chromatograph, or the like is ionized by an ion source 500. As the ion source is under the atmospheric pressure, and the mass spectrometer is operated in vacuum, an ion 510 is introduced into the mass spectrometer through an interface 520 between atmosphere and vacuum.

A quadrupole power supply 580 applies AC voltage (high frequency voltage) and DC voltage to a first quadrupole electrode section 540 (in which a quadrupole electrode 530 exists) for passage of only target ions among those with a variety of mass, which have been generated by the ion source so that only the target ion originated from the measurement sample is selected and passed. A second quadrupole electrode section 541 receives collision gas 570 (nitrogen gas, argon gas, or the like) for dissociating the target ion, which has been introduced from a supply source through a gas line 571.

A second quadrupole electrode 531 is normally configured to apply only AC voltage from the quadrupole power supply 580 to eliminate mass selectivity, and to cause collision of the gas with the target ion which has passed through the first quadrupole electrode section 540 so that fragment ions are generated. The generated fragment ion passes through the second quadrupole electrode section 541, and enters a third quadrupole electrode section 542.

When the quadrupole power supply 580 applies the high-frequency voltage and DC voltage for passage of the target fragment ion to a third quadrupole electrode 532, only the target fragment ions pass through the third quadrupole electrode section 542. A detector 550 detects the target fragment ions which have passed. Detection signals are sent to a data processing section 560 so that mass spectrometric analysis is performed.

The configuration of the triple-quadrupole type mass spectrometer called Triple QMS has been described as an example. The disclosed technology is applicable to the quadrupole mass spectrometer such as a Single QMS having a single unit of QMF placed therein. In the example, the quadrupole is described as a mass filter. The disclosed technology is also applicable to a multipole mass filter without limitation to the quadrupole mass filter.

FIG. 1 is a block diagram of a high frequency voltage generation section of the quadrupole mass spectrometer of the example.

A quadrupole electrode 111 is connected to a secondary coil L2 of a transformer 109. Application of high frequency current to a primary coil L1 of the transformer 109 by an RF amplifier 108 causes the secondary coil to generate the high frequency voltage to be applied to the quadrupole electrode 111. A detector circuit 110 detects an amplitude of the applied high frequency voltage. An AD converter circuit 107 performs analog-to-digital conversion of the output from the detector circuit 110. The detector output data which have been converted into digital values are input to a logic circuit 101.

In the logic circuit 101, an adder (subtracter) 102 calculates a difference value between the detector output data and set data of the high frequency voltage amplitude, which have been input from the control section 100. Based on the difference, an arithmetic operation for feedback control of a PID arithmetic 103 is performed. A multiplier 104 multiplies the data which have been subjected to the arithmetic operation for feedback control by sine wave data 105 corresponding to frequency of the high frequency voltage to generate high frequency signal data. The generated high frequency signal data are input to a DA converter circuit 106, and subjected to digital-to-analog conversion so that a high frequency signal is generated. The high frequency signal is input to the RF amplifier 108 for supplying the high frequency current to the primary coil L1 of the transformer 109 to generate the high frequency voltage in the secondary coil L2.

The feedback control arithmetic operation is digitally executed for controlling the high frequency voltage amplitude to attain the target value without being influenced by temperature change. Accordingly, the amplitude value of the high frequency voltage can be measured without temperature fluctuation by securing the temperature stability of an analog section on a feedback path including the detector circuit 110 and the AD converter circuit 107. Even in the case where temperature change occurs in the DA converter circuit 106 or the RF amplifier 108 to vary the output, execution of the feedback control ensures to stabilize the high frequency voltage amplitude without being influenced by the temperature change.

The digital arithmetic operation for executing the feedback control of the high frequency voltage amplitude allows easy change in various arithmetic coefficients for PID control, for example, proportionality coefficient, integral action coefficient, and differential coefficient only by setting those coefficients in a register of the logic circuit from the control section 100, and easy change to arbitrary frequency by using, for example, direct digital synthesizer for processing the sine wave data 105.

In place of the logic circuit 101, the control section 100 and a memory may be used for executing the digital operation. In this case, an AD converter circuit and a DA converter circuit are connected to the control section 100. As this configuration does not require the use of the logic circuit, the low-cost and space-saving effects can be attained.

The control section 100 receives measurement item information about measurement contents. Any other control device can receive the measurement item information by communication, or a user can input such information via a not shown input device. The control section 100 changes high frequency voltage amplitude set data based on the measurement item information.

Figure 2:
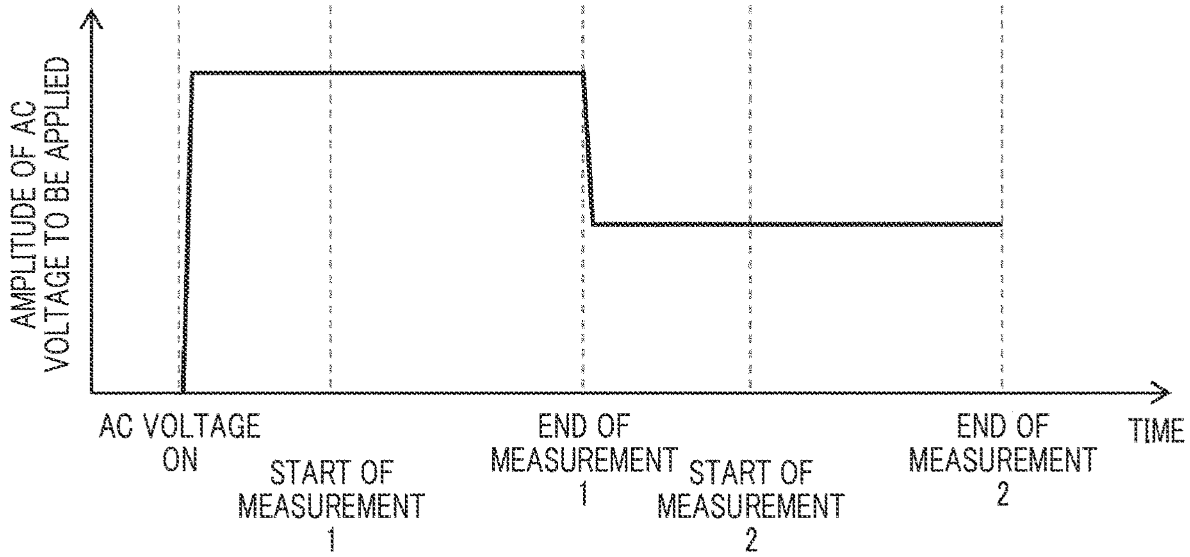
FIG. 2 represents an AC voltage control content when the next measurement content is known.
Figure 3A:
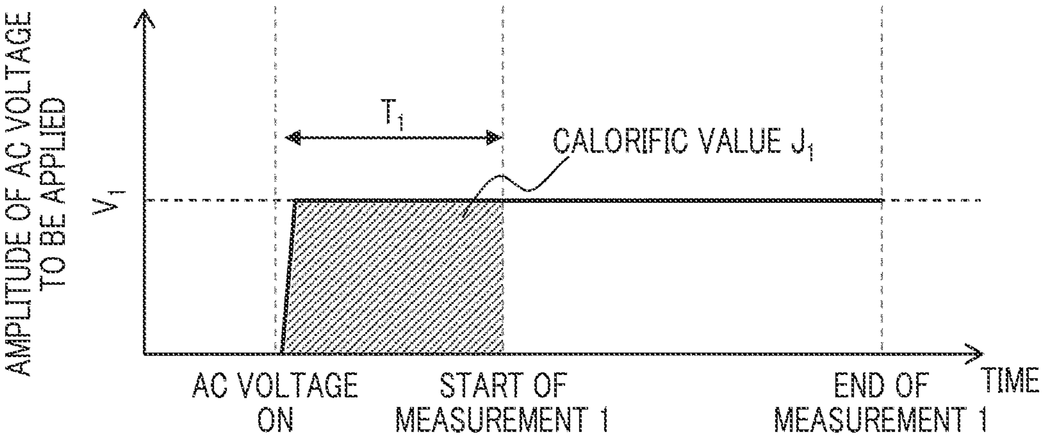
FIG. 3A represents an AC voltage control content when the next measurement content is known.
Figure 3B:
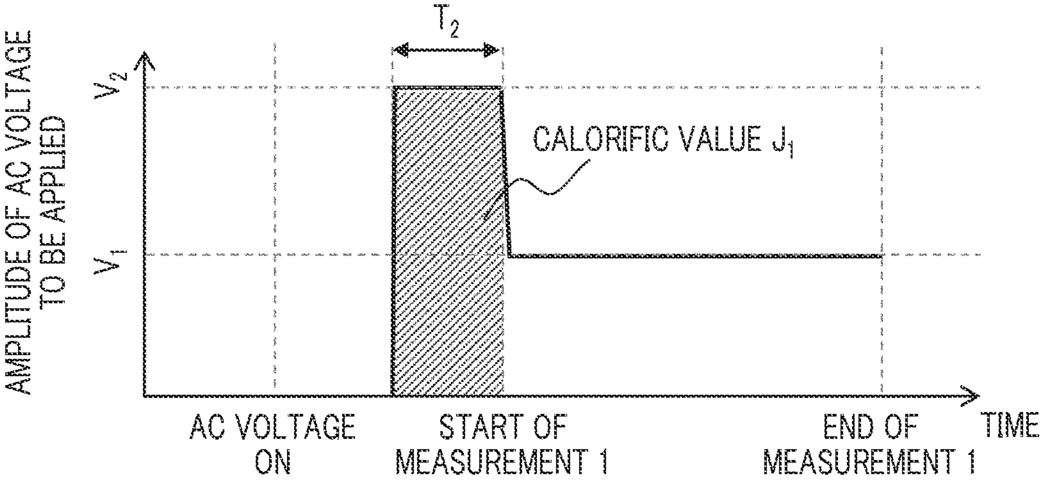
FIG. 3B represents an AC voltage control content when the next measurement content is known.
Figure 4:
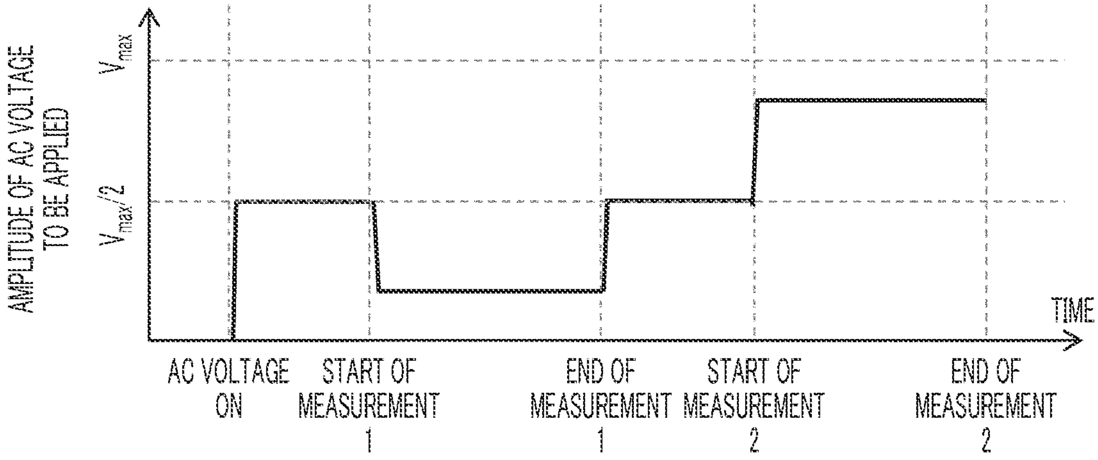
FIG. 4 represents an AC voltage control content when the next measurement content is unknown.
Figure 6:
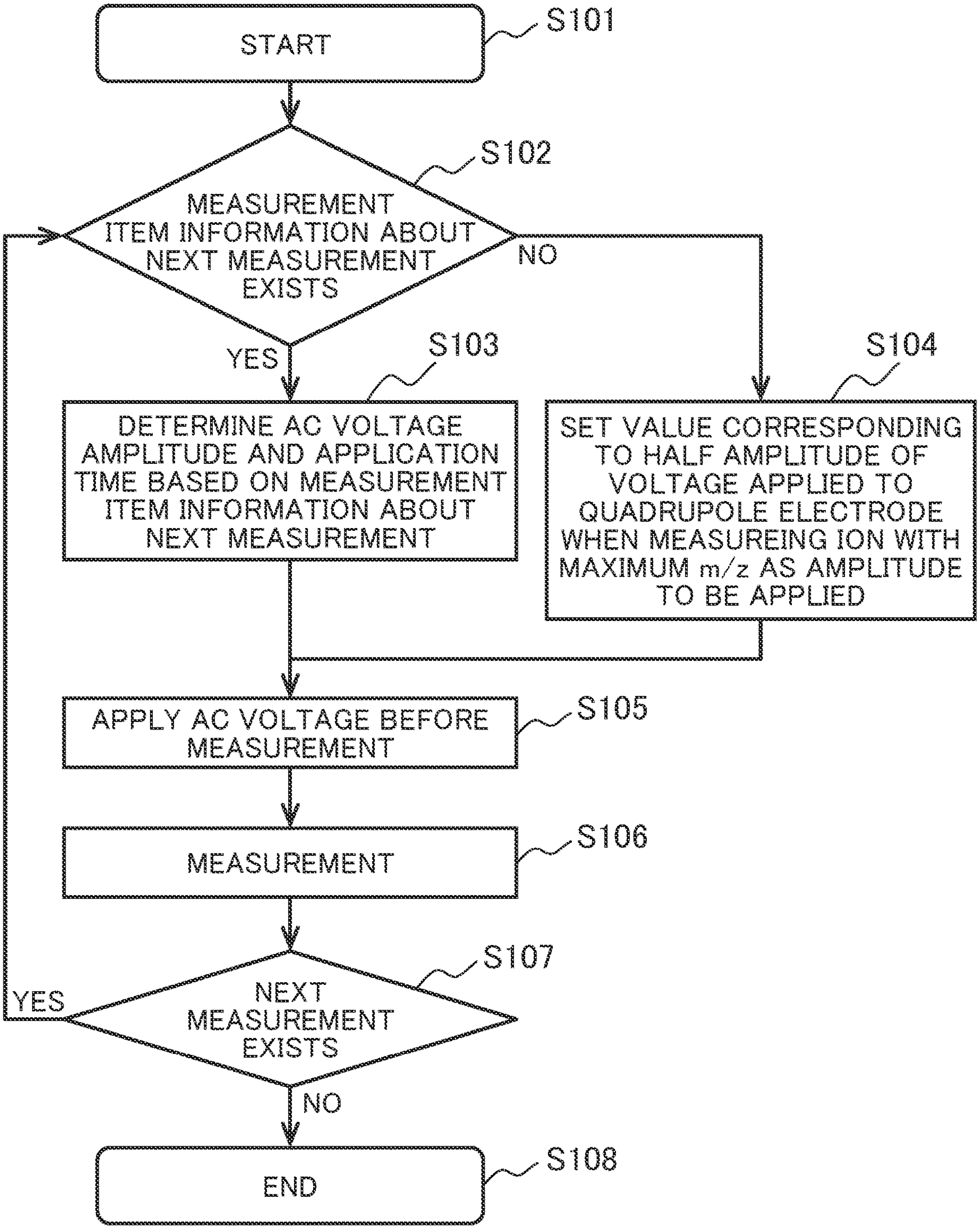
FIG. 6 is a flowchart of the process for controlling the AC voltage according to the example.

FIGS. 2 to 4 illustrate control contents of the AC voltage amplitude and application time according to the example. FIGS. 2, 3A, 3B represent control contents in the case where the next measurement content is known for the control section 100. FIG. 4 represents control contents in the case where the next measurement content is unknown for the control section 100. FIG. 6 is a flowchart of the process for controlling the AC voltage.

<Next Measurement Content is Known>

If the next measurement content is known, the AC voltage with amplitude to be used next is applied before measurement. This method allows suppression of change in the calorific value owing to application of the AC voltage to the quadrupole electrode 111. This makes it possible to perform measurement with stable mass axis immediately after start of the measurement.

Referring to an example of FIG. 2, the measurement content of measurement 1 is known before start of the measurement 1, and the measurement content of measurement 2 is known before start of the measurement 2. Specifically, in this case, the value of AC voltage applied to the quadrupole electrode 111 in the measurement may be made known by the time when the AC voltage application is enabled as preparatory process before measurement. The "time when the AC voltage application is enabled as preparatory process before measurement" represents the timing as indicated by "AC VOLTAGE ON" in the case of the measurement 1, and the timing at the end of the measurement 1 in the case of the measurement 2. The "value of AC voltage applied to the quadrupole electrode 111 in the measurement" may be input to the control section 100 as a part of the measurement item information, or read from the data table preliminarily set by the control section 100 based on the measurement item information.

The amplitude of AC voltage to be applied before measurement, and the application time are set so that the calorific value generated upon application of the AC voltage to the quadrupole electrode 111 becomes equivalent to the calorific value generated upon application of AC voltage until a thermally steady state is attained in the measurement.

Referring to FIGS. 3A and 3B, a relationship among the AC voltage amplitude, the application time, and the calorific value is described. It is assumed that amplitude applied in the measurement 1 is defined as $V_1$. It is further assumed that application of the amplitude $V_1$ for the time $T_1$ attains the thermally steady state, and the resultant calorific value is defined as $J_1$. The amplitude and the application time of the AC voltage to be applied may be determined so that the calorific value of the quadrupole electrode 111 becomes equivalent to the value $J_1$ in the period from the timing (timing indicated by "AC VOLTAGE ON" as shown in FIG. 3A) at which the AC voltage application is enabled as the preparatory operation before start of the measurement 1 to the timing (timing indicated by "START OF MEASUREMENT 1" as shown in FIG. 3A) at which the measurement 1 is started.

FIG. 3A shows an example of the amplitude $V_1$ applied from the time $T_1$ before start of the measurement 1. The calorific value is proportional to the product of the AC voltage amplitude and the application time. Assuming that the calorific value generated by application of the amplitude $V_2$ for the time $T_2$ is defined as $J_1$, the AC voltage with amplitude $V_2$ may be applied from the time $T_2$ before start of the measurement 1 as shown in FIG. 3B.

The amplitude of AC voltage to be applied before measurement, and the application time may be input to the control section 100 as a part of the measurement item information. They may be read from the data table preliminarily set by the control section 100 based on the measurement item information or the set value of the AC voltage to be applied to the quadrupole electrode 111 for measurement. The control section 100 may be configured to obtain the data based on a predetermined formula.

<Next Measurement Content is Unknown>

If the next measurement content is unknown, the AC voltage with intermediate amplitude is applied before measurement. When selecting the low voltage after applying the maximum voltage like the generally employed technique, the difference in the calorific value becomes large, resulting in great influence on deviation of the mass axis. Unlike the generally employed technique for applying the maximum voltage, application of the AC voltage with intermediate amplitude suppresses deviation of the mass axis on the average irrespective of the level of the amplitude of the AC voltage for the next measurement.

FIG. 4 shows an example of the content of controlling the AC voltage when the next measurement content is unknown. It is assumed that a maximum amplitude $V_{max}$ represents the amplitude of voltage applied to the quadrupole electrode 111 upon measurement of ion with maximum m/z (mass-to-change ratio) which can be measured by the mass spectrometer, and an intermediate amplitude $V_{max}/2$ represents the amplitude half the maximum amplitude. As the measurement contents of both the measurements 1 and 2 are unknown, application of AC voltage with the intermediate amplitude $V_{max}/2$ is started from the timing when the AC voltage application is enabled as the preparatory process before starting the measurement.

Determination as to whether the next measurement content is unknown may be made at the timing when the AC voltage application is enabled as the preparatory process before measurement, or after an elapse of a prescribed length of time from when the AC voltage application is enabled as the preparatory process before measurement.

Control operations executed when the measurement content is known can be combined with control operations executed when the measurement content is unknown. For example, it is assumed that the measurement content of the measurement 1 for the first time is known, and the measurement content of the subsequent measurement 2 is unknown. In this case, before start of the measurement 1, the AC voltage is applied to the quadrupole electrode 111 so that the resultant calorific value becomes equivalent to the one obtained when applying the AC voltage amplitude for the measurement 1 until the thermally steady state is attained. At the end of the measurement 1, the AC voltage with intermediate amplitude $V_{max}/2$ may be applied to the quadrupole electrode 111 before start of the measurement 2.

<Flow of Controlling AC Voltage>

Referring to FIG. 6, the process flow of controlling the AC voltage according to the example is described. The process represented by the flowchart is executed by the control section 100.

After starting execution of the process (S101), the control section 100 confirms whether the measurement item information about the next measurement exists (S102).

If the measurement item information about the next measurement exists, the AC voltage amplitude and the application time are determined based on the measurement item information about the next measurement (S103), and the AC voltage is applied before measurement (S105).

If the measurement item information about the next measurement does not exist, half amplitude (intermediate amplitude $V_{max}/2$) of the voltage applied to the quadrupole electrode 111 upon measurement of ion with maximum m/z is set as the amplitude to be applied (S104). The AC voltage is then applied before measurement (S105). The application time may be defined as the length of time for keeping the AC voltage application from when the AC voltage application is enabled after determination of the amplitude to the start of measurement. If the measurement start timing is known, application of the AC voltage may be started a prescribed time before starting the measurement. The prescribed time represents the application time required for bringing the quadrupole electrode 111 into the thermally steady state at the intermediate amplitude $V_{max}/2$.

After application of the AC voltage before measurement (S105), measurement of a sample is performed (S106). It is determined whether the next measurement exists (S107). If the next measurement exists, the process returns to step (S102) for confirming whether the measurement item information about the next measurement exists. If the next measurement does not exist, the process ends (S108).

The control section 100 may be constituted by a single unit or multiple units. The control section 100 may be incorporated into the mass spectrometer, or provided outside the mass spectrometer.

The present disclosure is not limited to the example as described above, but includes various modifications. For example, the example is described in detail for readily understanding of the present disclosure which is not necessarily limited to the one equipped with all structures as described above. It is possible to replace a part of the structure of one example with the structure of another example. The one example may be provided with an additional structure of another example. It is further possible to add, remove, and replace the other structure to, from and with a part of the structure of the respective examples.

The control line and information line considered as necessary for explanations are only shown. They do not necessarily represent all the control and information lines for the product. Actually, it may be considered that almost all the components are connected to one another.

LIST OF REFERENCE SIGNS

100: control section
101: logic circuit
102: adder (subtractor)
103: PID arithmetic
104: multiplier
105: sine wave data
106: DA converter circuit
107: AD converter circuit
108: RF amplifier
109: transformer
110: detector circuit
111: quadrupole electrode

The invention claimed is:

1. A mass spectrometer including a multipole electrode to which an AC voltage is applied, and a control section for controlling a voltage value of the AC voltage, the mass spectrometer using the multipole electrode as a mass filter, wherein:

the control section applies the AC voltage with predetermined amplitude to the multipole electrode for a predetermined period of time before measurement; and a calorific value generated upon application of the AC voltage with the predetermined amplitude to the multipole electrode for the predetermined period of time is equivalent to a calorific value generated upon application of the AC voltage with amplitude applied in the measurement until reaching a thermally steady state, wherein when measurement item information relating to the measurement is unknown, the control section sets a value corresponding to half the amplitude of the voltage to be applied to the multipole electrode upon measurement of an ion with maximum m/z as the predetermined amplitude.

2. The mass spectrometer according to claim 1, wherein the control section sets the predetermined amplitude and the predetermined period of time based on measurement item information relating to the measurement.

3. A method of controlling a mass spectrometer which includes a multipole electrode to which an AC voltage is applied, and uses the multipole electrode as a mass filter, the method comprising:

applying the AC voltage with predetermined amplitude to the multipole electrode for a predetermined period of time before measurement; and setting the predetermined amplitude and the predetermined period of time so that a calorific value generated upon application of the AC voltage with the predetermined amplitude to the multipole electrode for the predetermined period of time becomes equivalent to a calorific value generated upon application of the AC voltage with amplitude applied in the measurement until reaching a thermally steady state, wherein when measurement item information relating to the measurement is unknown, a value corresponding to half the amplitude of the voltage to be applied to the multipole electrode upon measurement of an ion with maximum m/z is set as the predetermined amplitude.

4. The method of controlling a mass spectrometer according to claim 3, wherein the predetermined amplitude and the predetermined period of time are set based on measurement item information relating to the measurement.

* * * * *